United States Patent

[11] 3,617,758

[72] Inventor Kazuo Nagamatsu
Amagasaki-shi, Japan
[21] Appl. No. 887,298
[22] Filed Dec. 22, 1969
[45] Patented Nov. 2, 1971
[73] Assignee Takeda Chemical Industries, Ltd.
Osaka-shi, Japan
[32] Priority Dec. 30, 1968
[33] Japan
[31] 44/800

[54] METHOD AND APPARATUS FOR MEASURING SIZE OF ZONE HAVING OPTICAL STAINS
15 Claims, 3 Drawing Figs.
[52] U.S. Cl. .................................................. 250/222,
250/219, 250/209, 356/167
[51] Int. Cl. .................................................. G01b 7/12
[50] Field of Search ........................................... 250/222,
222 M, 218, 209, 219 LG, 219 WD; 356/156, 157,
158, 167, 201, 244

[56] References Cited
UNITED STATES PATENTS
3,233,506  2/1966  Hart et al. ................... 356/156
3,313,944  4/1967  Muir .......................... 250/209 X
3,362,284  1/1968  Patrignani ................... 250/219X
3,396,278  8/1968  Hjorth ........................ 250/219

Primary Examiner—Walter Stolwein
Attorney—Larson, Taylor & Hinds

ABSTRACT: In measuring the size of a zone having optical stains, such as an inhibition zone of micro-organism growth, the method of the invention is characterized by scanning said zone by plural photoconductive detectors disposed in a row at a constant speed, the scanning direction being at a right angle to the row of said detectors, and measuring the size of said zone by electrically measuring the time during which at least one of said detectors is in operation.

PATENTED NOV 2 1971　3,617,758

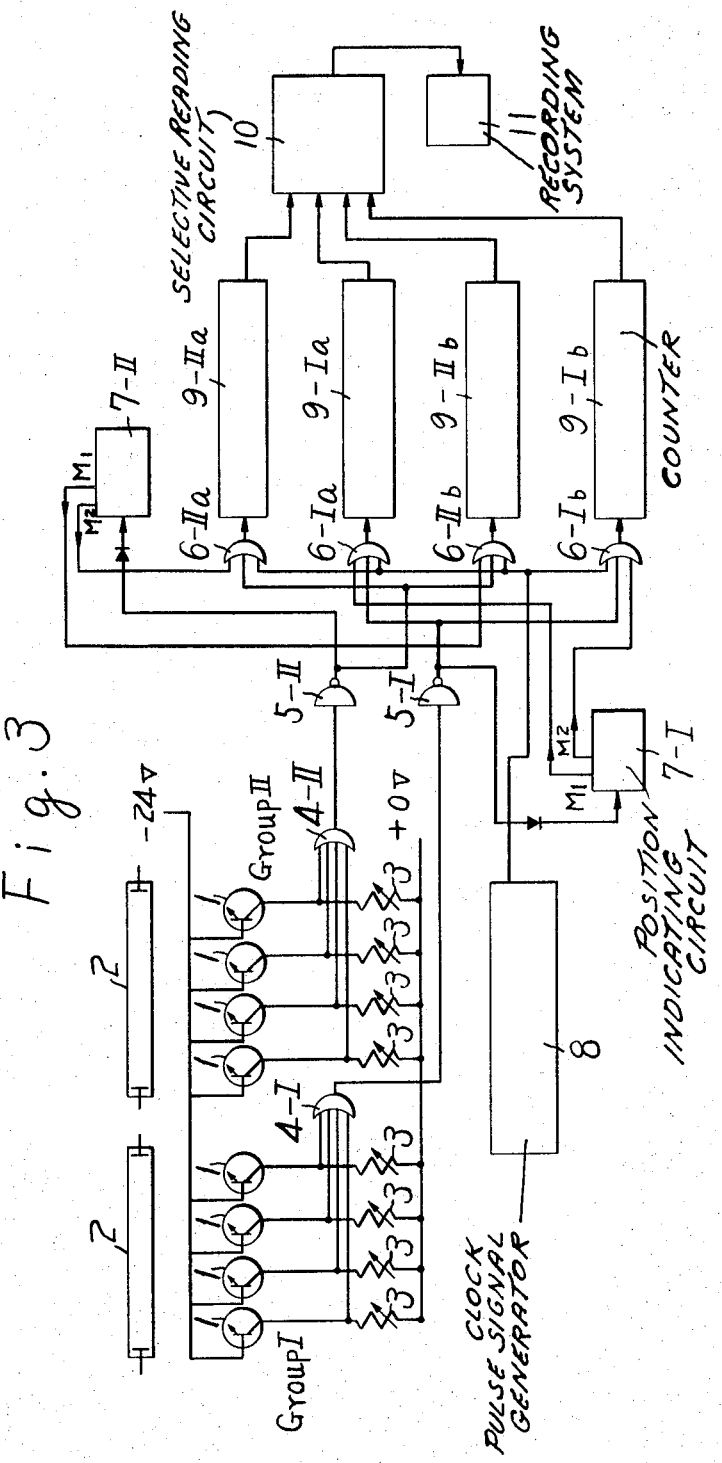

METHOD AND APPARATUS FOR MEASURING SIZE OF ZONE HAVING OPTICAL STAINS

The present invention relates to a method and apparatus for measuring the size of a zone having optical stains, more particularly to a novel and useful method and apparatus for automatically measuring the size of the above-mentioned zone by employing photoconductive cells.

By the "optical stains" herein used are meant the parts of the zone to be measured which differ from the main portion thereof in transmission factor of light. Although the extent of difference in the transmission factor of light varies depending upon the performance of the photoconductive cells used, the optical stains as referred to in the present invention include opaque portions present in a transparent zone or transparent portions existing in an opaque zone.

For example, when an antibiotic is applied to agar already inoculated with bacteria, the antibiotic diffuses from the portion to which it is applied to inhibit the growth of the bacteria and form a transparent circular zone, while the other portion turns opaque due to the growth of the micro-organisms. By measuring the size of transparent zone of inhibition, the potency of the antibiotic to inhibit the growth of the micro-organism can be measured. In general, the size of the zone of inhibition has conventionally been determined by measuring the zone with the naked eye or by enlarging the zone by a magnifying projector and measuring the diameter of the zone. Such method however, has a disadvantage that the optically indistinct boundary of the zone of inhibition produces inevitable differences in the readings between individual inspectors with the result that it is impossible to obtain objective accurate data. Moreover, measurement not only requires much efforts by is also inefficient.

While carrying out extensive studies on the method for automatically measuring the size of the zone of inhibition by using photoconductive detectors, the present inventors found out that the malfunction of the photoconductive detectors attributable to the presence of optical stains at irregular intervals makes it impossible to effect accurate measurement of size of the zone. That is to say, the zone of inhibition includes minute opaque spots formed by local growth of the micro-organism, and the application of antibiotic by cylinders as in a conventional method produces indentations in the inoculated agar which are low in the transmission factor of light, whereas when the antibiotic is applied to agar by using filter paper, the filter paper prevents transmission of light. As a result, upon detecting such optical stains, the photoconductive detector functions as if they were the boundary of the zone.

Accordingly, a principal object of the present invention is to provide a method and apparatus for automatically and accurately measuring the size of a zone having optical stains by a photoconductive system whereby the size of the zone can be measured efficiently without efforts to obtain objective and accurate data.

Another object of the present invention is to provide an apparatus for measuring the size of such zone which is capable of electronically memorizing the size of the zone detected by photoconductive detectors and recording the result on a tape or card by punching.

Another object of the present invention is to provide a method and apparatus adapted for measuring the diameter of a circular zone, particularly for measuring the diameter of a circular zone of inhibition of micro-organism growth.

These and other objects of the present invention will become apparent from the following description.

The objects of the present invention described are accomplished by scanning a zone to be measured having optical stains by plural photoconductive detectors disposed in a row at a constant speed, the scanning direction being at a right angle to the row of said detectors, and measuring the size of said zone by electrically measuring the time during which at least one of said detectors is in operation.

In accordance with the present invention, at least two photoconductive detectors arranged in a row are employed and the zone to be measured having optical stains is scanned by the plural detectors disposed in a row by bringing either one of said zone or a row of at least two photoconductive detectors into passing relationship with the other at a constant speed at a right angle to the row of the detectors. The passage of the zone to be measured is detected as far as at least one of the photoconductive detectors is in operation, and the time for the zone to pass through the detecting section is measured electrically utilizing the signal from at least one of photoconductive detectors which is detecting the passage of the zone, whereby the size of the zone is obtained based upon the time thus measured. According to the present invention the passage of the zone to be measured is detected as far as at least one of the photoconductive detectors is in operation, so that even in case where one of the detectors should malfunction upon detecting an optical stain in the zone to be measured, the other detectors operate normally to detect the passage of the zone and compensate for the malfunction, with the result that the passage of the zone is always detected with high reliability. The passage of a zone with optical stains can be detected free of troubles accordingly.

The present invention is particularly suitable for measuring the diameter of a circular zone having optical stains such as a circular zone of inhibition of micro-organism growth. For such measuring operation, the photoconductive detectors disposed in a row are so arranged that at least one of the detectors scans substantially along the center line of the circular zone while the rest of the detectors scan the other portions of the zone. It is not necessarily required that the former detector scan exactly on the centerline but it may scan along some other line deflected from the centerline within the allowable range of tolerance. In this manner at least one of the photoconductive detectors performs scanning substantially along the centerline of the circular zone and the rest of the detectors scan the other portions, the operation thus effected being such that even if the former should malfunction due to the presence of optical stains the later detectors compensate for the malfunction to insure accurate measurement of the diameter of the circular zone.

In addition to the problems attributable to the optical stains, following difficulties are not infrequently encountered in measuring the diameter of the circular zone of inhibition of micro-organism. In usual operation the diameters of plural circular inhibition zones arranged along a line are successively measured, but the circular zones are not always aligned accurately and accurate measurement of the diameter may not be achieved. For instance even when a photoconductive detector is in accurate alignment with centerline of the first zone of inhibition for the measurement of the diameter, the detector may not be in substantial alignment with the centerline of the second inhibition zone and accurate measurement of the diameter will not be made, if the second inhibition zone is deviated beyond the range of tolerance.

A preferred mode of the present invention has the advantage to overcome this problem. In accordance with the preferred mode, the photoconductive detectors are arranged in a row in such manner that at least one of the detectors scans substantially along the centerline of desired one of plural circular zones of inhibition to be measured. (Such inhibition zone is hereinafter referred to as "datum circle"). The photoconductive detectors are disposed in a row in such arrangement relative to the datum circle that satisfies the formulas I and II below:

$$1.4d \geqq L > 2v \quad \text{(I)}$$
$$s \leqq 2e \quad \text{(II)}$$

wherein $L$ is the length of row of the photoconductive detectors; $s$ is the space between the respective photoconductive detectors; $d$ is the diameter of the datum circle (which is measured by the naked eye); $v$ is the greatest of the deflections of the circular inhibition zones from the centerline of the datum circle which is perpendicular to the row of the detectors, the deflections being in the direction of the row (measured by the naked eye); and $e$ is allowable deflection of the circular inhibition zone from the centerline of the datum circle which is perpendicular to the row of the detectors, the deflection being in the direction of the row.

As apparent from Formula (I), the length of the row of the plural photoconductive detectors is greater than twice the greatest deflection ($v$) from the datum circle and the photoconductive detectors are spaced apart by a distance not greater than twice the allowable deflection ($e$). Accordingly, even in the case where the deflection of a inhibition zone exceeds the allowable range ($e$), at least one of the photoconductive detectors always scans along the line which is within the range of allowable deflection from the centerline of the inhibition zone, with the result that the diameters of a plurality of circular inhibition zones can be measured accurately and successively all the time. The present invention is particularly advantageous in an instance where the greatest deflection ($v$) of the zone is not greater then $0.4 \times d$, preferably not exceeding $0.2 \times d$. The number of the photoconductive detectors in one row, which is an integer greater than $v/e+1$, is not less than 2, preferably not less than 4. The number of the row of the photoconductive detectors is not limited to 1 but it may be increased to a desired number depending upon the number of the rows of the circular inhibition zones to be measured. For example, provision of 20 rows of the detectors makes it possible to measure the diameters of circular zones arranged in 20 rows, each of which comprises plural zones.

Based upon the signals emitted from at least one photoconductive detectors which is in operation, the time for the zone to pass through the detecting section can be measured by a suitable method as by a method in which clock pulses are emitted only during this time and the resultant pulses are counted.

Furthermore when desired, the value of the time of passage may be memorized in an electronic memory means and the memorized information may be released by appropriate selective-reading means for printing or punching on a tape or card.

For better understanding of the features of the present invention, the invention as applied in measuring the size of inhibition zone of growth of organism will be described with reference to the accompanying drawings, in which:

FIG. 3 is a circuit diagram showing a preferred embodiment of a measuring apparatus to be used in the present invention.

Figure 1:
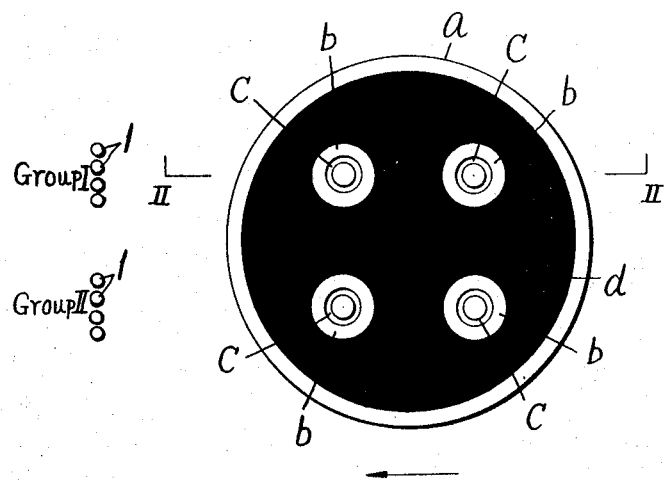
FIG. 1 is a plan view showing the arrangement of phototransistors and an example of Petri dish having circular zones to be measured in which growth of organism is inhibited.
Figure 2:
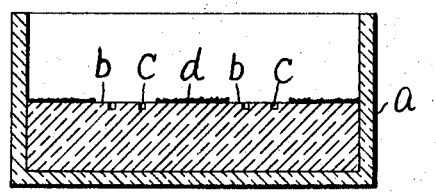
FIG. 2 is a view in section showing the zones of inhibition on the plate along the line II—II in FIG. 1.

As shown in FIGS. 1 and 2, a Petri dish $a$ is provided with four inhibition zones $b$ of growth of organism each of which has a recess $c$ formed by the cylinders used in applying an antibiotic substance. The portion $d$ where the growth of the organism has occurred is opaque, while the circular zones $b$ of inhibition is transparent with a lower transparency in the recess $c$. Although not illustrated in the drawings, the zone $b$ of inhibition has opaque spots of organism growth.

A detecting section comprises two rows i.e. Group I and Group II of phototransistors 1, each row being composed of four phototransistors 1. The phototransistors 1 in each row are provided with lamp 2 respectively. By way of variable resistors 3 phototransistors 1 are connected to OR-circuits 4–I and 4–II provided for respective groups. The OR-circuit 4–I is connected through a NOT-circuit 5–I to two OR-circuits 6–I$a$ and 6–I$b$ and to a position-detecting circuit 7–I. In like manner, the other OR-circuit 4–II is connected through a NOT-circuit 5–II to two OR-circuits 6–II$a$ and 6–II$b$ and to a position-detecting circuit 7–II. Each of the OR-circuits 6–I$a$ and 6–I$b$ receives a signal from the position-detecting circuit 7–I and a signal pulse circuit 8, while the OR-circuits 6–II$a$ and 6–II$b$ receive a signal from the position-detecting circuit 7–II and a signal from the clock pulse circuit 8. Each of the OR-circuits 6–I$a$, 6–I$b$, 6–II$a$ and 6–II$b$ is connected to counters 9–I$a$, 9–I$b$, 9–II$a$ and 9–II$b$ respectively. Each of these counters is connected to a selective-reading circuit 10 which is further connected to a punching section 11.

The above-mentioned dish $a$ is secured to a transparent support (not shown) which is adapted to be moved by a motor (not shown) at a constant speed at a right angle to the direction of the row of phototransistors 1, namely in the direction shown by an arrow in FIG. 1. Thus, the two zones of inhibition in the upper row in FIG. 1 will be detected by the phototransistors in the group I and the two zones of inhibition in the lower row by those in the group II. Since the operation to detect the zone of inhibition is conducted by the phototransistors 1 in Group I and by those in Group II exactly in the same manner, the following description will be made only with respect to the Group I for simplification.

When transparent zone of inhibition reaches the detecting section of the phototransistors 1 as the dish $a$ is moved forward, the light from lamps 2 strikes the phototransistors 1, whereupon current flows through the phototransistors 1. In accordance with the present invention, the sensitivity of the four phototransistors is adjusted by the variable resistors 3 and the apparatus of this embodiment is so designed that when current passes through at least one of the four phototransistors 1 to produce a voltage of $-4$ to $-6$ v. upon reduction by the resistor 3, the OR-circuit 4–I connected to the resistor gives an output of $-24$ v. Accordingly, even if one of the four phototransistors should malfunction upon detecting an opaque spot of organism or the recess 3 of low transparency, the OR-circuit 4–I continues to give an output of $-24$ v all the time insofar as at least one of the other three phototransistors is detecting a transparent zone. The output $-24$ v. of the OR-circuit 4–I is inversed by the NOT-circuit 5–1 to 0 v. and the output of the NOT circuit is then applied to the two OR-circuits 6–I$a$ and 6–I$b$ and to the position-detecting circuit 7–I which is composed, in the present embodiment, of a binary counter having flip-flop circuit. The OR-circuits 6–I$a$ and 6–I$b$ further receive the signal from the position-detecting circuit 7–I and the signal from the clock pulse circuit 8. The clock pulse circuit 8 is designed to generate 240-Hz. pulses of $-24$ v. which are in phase with the cycle of the power source of the motor for moving the dish $a$ at the constant speed.

When a signal 0 v. is fed from the NOT-circuit 5–I to the position-detecting circuit 7–I, the counter counts one pulse to give a signal of $-24$ v. at $M_1$. Consequently, the output of the OR-circuit 6–I$a$ connected to $M_1$ is maintained at the constant level of $-24$ v. without sending out clock pulse to the counter 9–I$a$. One the other hand, in response to ons and offs between $-24$ v. and zero V of the clock pulse, the output of the OR-circuit 6–I$b$ connected to $M_2$ and applied with a signal of 0 v. is turned on and off to supply pulses to the counter 9–I$b$. While current is passing through the phototransistor 1, namely while the phototransistor 1 is detecting the zone to be measured, the OR-circuit 6–I$b$ receives a signal of v. from $M_2$ and sends out pulses to the counter 9–I$b$, which therefore counts the pulses during this period. Thus the time for the zone to pass through the detecting section is measured. When one zone to be measured completely moves past the phototransistors in Group I, current no longer flows through the transistors 1. Subsequently when the phototransistors 1 detect the next zone and current passes through the phototransistors again, signal is fed to the counter in the position-detecting circuit 7–I with resultant output of 0 v. at $M_1$ and an output of $-24$ v. at $M_2$ to interrupt supply of pulses to the counter 9–I$b$ and apply pulses to the counter 9–I$a$. Thus, the time for the zone to pass through the detecting section is measured in the manner similar to the above. In this manner the OR-circuits 6–I$a$, 6–I$b$, 6–II$a$ and 6–II$b$ serve as gate circuits to feed pulses to the counter only while detecting the zone.

The operation of the phototransistors in the Group II is effected exactly in the same manner as that of the phototransistors in Group I described above and the times of passage of the two zones in the lower row in FIG. 1 are respectively counted by the counters 9–II$a$ and 9–II$b$.

The passage time counted and memorized by the counters is read by the selective-reading circuit 10 whose output signal is then sent to the punching section 11, where the information is recorded on a card or tape by punching. The selective-reading circuit and the punching section may be of conventional structures known in the art. To facilitate orderly arrangement of the recorded information, a printing circuit with an external switch may be connected to the punching section 11 by which appropriate reference numbers may be printed on the punched card or tape.

The counters which have counted the passage times of the two zones in this manner are then reset for the subsequent operation on the next plate.

Although the present invention has been described above with respect to the operation to measure the size of the inhibition zone of micro-organism, the application of the method and apparatus of the present invention is not limited to such operation but the present invention is also applicable to the measurement of various types of zones which have optical stains as will be apparent to those skilled in the art. The method and apparatus of the present invention, for instance, can be employed not only in measuring the size of a transparent zone other than inhibition zone of micro-organism growth which has stained portions that are opaque or of low transmission factor of light, but also in measuring the size of an opaque zone having stains which are transparent or of high transmission factor of light and which are present at irregular intervals.

Furthermore, the method and apparatus the present invention are not limited to the foregoing embodiment, but various alterations are possible. For instance, instead of providing the binary counter having a flip-flop circuit and serving as position-detecting circuit, the counter may be provided with an external switch for switching of the counter. While the foregoing embodiment is so arranged that the zone to be measured is moved relative to the stationary photoconductive detectors, the photoconductive detectors may be moved at a constant speed so as to scan a stationary zone to be measured.

What we claim is:

1. A method for automatically measuring circular zones having optical stains said zones being inhibition zones of micro-organisms comprising; (a) scanning said zones by plural photoconductive detectors disposed in a row at a constant speed, the scanning direction being at a right angle to the row of said detectors, said circular zones being arranged in plural number on a line with defection and said photoconductive detectors being disposed in a row in such arrangement relative to a desired one of said circular zones serving as a datum circle that satisfies the formulas, $$1.4\,d \geqq L\,2v,$$
$$s \leqq 2e$$

wherein $L$ is the length of row of said photoconductive detectors; $s$ is the space between said respective photoconductive detectors; $d$ is the diameter of said datum circle; $v$ is the greatest of the deflections of said circular zones from the centerline of said datum circle which is perpendicular to the row of said detectors, the deflections being in the direction of the row of said detectors; and $e$ is allowable deflection of said circular zone from the centerline of said datum circle which is perpendicular to the row of said detectors, the deflection being in the direction of the row, and (b) measuring the size of said zones by electrically measuring the time during which at least one of said detectors is in operation.

2. The method for automatically measuring the size of a zone having optical stains according to claim 1 wherein $v$ in said formula is not greater than $0.4 \times d$.

3. The method for automatically measuring the size of a zone having optical stains according to claim 1 wherein said row of the photoconductive detectors comprises at least 4 photoconductive detectors.

4. The method for automatically measuring the size of a zone having optical stains according to claim 1 wherein the number of the row of said photoconductive detectors is 1 to 20.

5. The method for automatically measuring the size of a zone having optical stains according to claim 1 wherein the electrical measurement of the time of scanning said zone is achieved by feeding clock pulse signals to a counter while at least one of said photoconductive detectors is in operation and counting the signals.

6. The method for automatically measuring the size of a zone having optical stains according to claim 5 wherein the clock pulse signals counted by said counter are read and recorded.

7. The method for automatically measuring the size of a zone having optical stains according to claim 5 wherein said counter is provided in plural number and the measurement of the time of scanning one zone is made by counting on one counter and the measurement of the time of scanning a next zone is made by counting on another counter by switching said counter.

8. The method for automatically measuring the size of a zone having optical stains according to claim 7 wherein switching of said counter is performed by a binary counter provided with a flip-flop circuit.

9. The method for automatically measuring the size of a zone having optical stains according to claim 7 wherein switching of said counter is performed by an external switch.

10. An apparatus for automatically measuring the size of circular zones having optical stains comprising plural photoconductive detectors arranged in a row relative to a desired one of said circular zones serving as a datum circle that satisfies the formulas, $$1.4\,d \geqq L\,2v$$
$$s \leqq 2e$$

wherein $L$ is the length of row of said photoconductive detectors; $s$ is the space between said respective photoconductive detectors; $d$ is the diameter of said datum circle; $v$ is the greatest of the deflections of said circular zones from the centerline of said datum circle which is perpendicular to the row of said detectors, the deflections being in the direction of the row of said detectors; and $e$ is allowable deflection of said circular zone from the centerline of said datum circle which is perpendicular to the row of said detectors, the deflection being in the direction of the row, means causing said detectors to scan said zones at a constant speed, the scanning direction being at a right angle to the row of said detectors, a clock pulse circuit, a gate circuit for effecting passage of the clock pulses only while at least one of said photoconductive detectors is in operation, and a counter for counting the clock pulses which have passed through the gate circuit.

11. An apparatus for automatically measuring the size of a zone having optical stains according to claim 10 wherein said row of photoconductive detectors comprises at least 4 photoconductive detectors.

12. The apparatus for automatically measuring the size of a zone having optical stains according to claim 10 wherein the number of the row of said photoconductive detectors is 1 to 20.

13. An apparatus for automatically measuring the size of a zone having optical stains according to claim 10 wherein said counter is provided in plural number, said apparatus being provided with means for switching said counter whereby after the measurement of the time of scanning one zone is made by counting on one counter the measurement of the time of scanning a next zone can be made by counting on another counter.

14. The apparatus for automatically measuring the size of a zone having optical stains according to claim 13 wherein said switching means is a binary counter provided with a flip-flop circuit.

15. The apparatus for automatically measuring the size of a zone having optical stains according to claim 13 wherein said switching means is an external switch.

* * * * *